United States Patent [19]
Scullin et al.

[11] Patent Number: 6,083,335
[45] Date of Patent: *Jul. 4, 2000

[54] PAINT FILM ASSEMBLY WITH MASKING FILM AND METHOD OF MAKING SAME

[75] Inventors: Charles T. Scullin, Edina, Minn.; Donald V. Flatt; Frederick E. Duhme, both of Hudson, Wis.

[73] Assignee: 3M Innovative Properties Company, St. Paul, Minn.

[*] Notice: This patent issued on a continued prosecution application filed under 37 CFR 1.53(d), and is subject to the twenty year patent term provisions of 35 U.S.C. 154(a)(2).

[21] Appl. No.: 09/366,589

[22] Filed: Aug. 4, 1999

Related U.S. Application Data

[62] Division of application No. 08/912,706, Aug. 18, 1997, Pat. No. 5,968,657.

[51] Int. Cl.⁷ .................................. B32B 1/00; B32B 33/00
[52] U.S. Cl. ............................ 156/196; 156/214; 156/249
[58] Field of Search ........................................ 156/196, 214, 156/249; 428/31, 423.1, 424.6, 421, 422

[56] References Cited

U.S. PATENT DOCUMENTS

| | | | |
|---|---|---|---|
| 4,147,679 | 4/1979 | Scriven et al. | 523/404 |
| 4,719,132 | 1/1988 | Porter, Jr. | 427/409 |
| 4,818,589 | 4/1989 | Johnson et al. | 428/201 |
| 4,913,760 | 4/1990 | Benson et al. | 156/244.11 |
| 4,931,324 | 6/1990 | Ellison et al. | 428/31 |
| 5,026,448 | 6/1991 | Reafler et al. | 156/212 |
| 5,034,077 | 7/1991 | Pata | 156/84 |
| 5,034,269 | 7/1991 | Wheeler | 428/317.3 |
| 5,125,994 | 6/1992 | Harasta et al. | 156/160 |
| 5,215,826 | 6/1993 | Shimanski | 428/483 |
| 5,268,215 | 12/1993 | Krenceski et al. | 428/213 |
| 5,514,427 | 5/1996 | Ellison et al. | 428/31 |
| 5,518,786 | 5/1996 | Johnson et al. | 428/40.6 |
| 5,612,135 | 3/1997 | Matsui et al. | 428/343 |

FOREIGN PATENT DOCUMENTS

| | | |
|---|---|---|
| 0 285 071 B1 | 7/1992 | European Pat. Off. . |
| 0 352 298 B1 | 11/1993 | European Pat. Off. . |
| 0768354 | 4/1997 | European Pat. Off. . |
| Hei-Sei 8-2550 | 1/1996 | Japan . |
| WO 88/07416 | 3/1988 | WIPO . |
| WO 91/03337 | 2/1994 | WIPO . |

*Primary Examiner*—Mark A. Osele
*Attorney, Agent, or Firm*—Harold C. Knecht, III

[57] ABSTRACT

A paint film assembly which includes a thermoformable paint film having a high gloss and DOI and a thermoformable masking film which is removably bonded to the paint film so as to better protect the paint film during shipping and handling, and during subsequent forming and processing (e.g., thermoforming and/or insert molding) of the paint film onto an article or part, while substantially retaining the surface finish of the paint film, particularly the gloss and DOI. The masking film comprises a urethane layer that is laminated or otherwise bonded to the paint film to form a masked paint film. The masking film is thermoformable and/or moldable with the paint film so as to form a thermoformable and/or moldable masked paint film. After the masked paint film is thermoformed and/or molded, the masking film is still readily removable from the paint film. The urethane layer is operatively adapted so as to at least substantially retain the high gloss and DOI of the paint film after the masked paint film is thermoformed and/or molded and the masking film is removed from the paint film.

11 Claims, 9 Drawing Sheets

PAINT FILM ASSEMBLY WITH MASKING FILM AND METHOD OF MAKING SAME

This is a divisional of application Ser. No. 08/912,706 filed Aug. 18, 1997 now U.S. Pat. No. 5,968,657.

FIELD OF THE INVENTION

The present invention is related to surfacing films that provide a decorative feature to a substrate, more particularly, to paint films for use in surfacing objects such as automobile parts and, even more particularly, to a thermoformable paint film assembly which includes a masking film removably adhered to a paint film and which substantially retains the surface finish of the paint film during thermoforming, especially the gloss and DOI of the paint film.

BACKGROUND OF THE INVENTION

Often one of the most important features of a product is its appearance. Automobile manufacturers are particularly concerned with the appearance of the automobiles they manufacture. Components such as, for example, automobile body panels, trim components, side view mirror housings and similar automobile parts have traditionally been spray painted to provide a desired appearance (i.e., color and finish). Recently, the spray painting of certain exterior automobile parts has been replaced with a prefabricated multi-layer paint film. In addition to other advantages, such paint films avoid the environmental problems associated with evaporating paint solvents and eliminate the need for additional paint facilities and the associated equipment, ovens, sludge disposal, and emission control systems. However, the use of prior paint films has had mixed results, particularly with regard to color and surface finish.

Such paint films typically include a decorative layer having the desired paint finish and are often pre-formed such as by thermoforming (i.e., forming the film while in a heated state). The pre-formed paint film is then adhered to the desired surface(s) of the part. When it is a plastic molded part, paint films have been adhered by being insert molded with the part. The decorative layer of some paint films have been formed by being cast onto a carrier layer. The surface of the carrier layer, on which the decorative layer is cast, is formed so as to produce the surface finish desired on the decorative layer. In addition, it has been taught to leave the carrier layer on the paint film, after the paint film is manufactured, to protect the paint film during shipping and handling and during subsequent application of the film to the part (e.g., thermoforming the paint film into a pre-formed state for bonding to the part).

Automobile manufacturers often require that the painted surfaces on their automobiles exhibit a very high gloss and DOI (i.e., Distinctness Of Image or mirror-like reflection), especially for metallic paint finishes. Casting the decorative layer onto a carrier layer having a high gloss finish has resulted in paint films with a high gloss and DOI. However, the thermoformability of some prior carrier layers has been very limited, thereby limiting the uses of the paint films to flat or lightly contoured parts. Paint films with carrier layers that exhibit improved thermoformability can be found, such as those described in U.S. Pat. No. 5,215,826 to Shimanski et al. However, the thermoformability of these carrier layers is still too limited. In addition, even with prior carrier layers that exhibit sufficient thermoformability for a particular use, too often a significant reduction in the gloss and DOI of the paint film has been observed after the paint film and carrier layer have been thermoformed.

Therefore, there is a need for a better way to protect a paint film during shipping and handling and during subsequent application of the film to the part (e.g., thermoforming the paint film into a pre-formed state for bonding to the part) while substantially retaining the surface finish of the paint film, particularly the gloss and DOI.

SUMMARY OF THE INVENTION

This need is met by providing a masking film which is removably bondable to a paint film, according to the principles of the present invention, so as to better protect the paint film during shipping and handling, and during subsequent forming and processing (e.g., thermoforming and/or insert molding) of the paint film onto an article or part, while substantially retaining the surface finish of the paint film, particularly the gloss and DOI (i.e., Distinctness Of Image or mirror-like reflection).

As used herein, a "paint film" includes a multilayer, thermoplastic film that provides surface protection and decoration for an underlying object, is sufficiently flexible to conform to the contours of the underlying object at processing temperatures, and has a color layer that has color agent(s) throughout and may include one or more of the following layers adhered thereto: a clear coat layer (on the surface for appearance and protection), a reinforcing layer (below the color layer for strength), and a bonding layer (at the bottom when needed to securely bond to the underlying object), and a liner layer (on the outer surface layer and removable therefrom). In addition, as used herein, a high gloss refers to at least about a 60 gloss at 20°, and a high DOI refers to at least about a 60 DOI.

In one aspect of the present invention a paint film assembly is provided which includes a thermoformable paint film having a high gloss and DOI. It may be desirable for the paint film to also be moldable, for example, by insert molding. It is desirable for the paint film to be thermoformable to a high degree of detail (i.e., deeply thermoformable so as to match heavily contoured surfaces). The paint film includes a color coat layer. It is desirable for the paint film to also include a clear coat layer covering the color coat layer. The clear coat layer and color coat layer can be formed and bonded together in any suitable way. For example, they can each be formed by being extruded or cast. They can be separately formed and laminated or otherwise bonded together; or they can be coated one onto the other (e.g., by being extruded, cast or sprayed one onto the other). A thermoformable masking film comprising a urethane layer (e.g., a cast or extruded urethane layer) is laminated or otherwise bonded to the paint film to form a masked paint film. The urethane layer does not have to comprise only a urethane. The masking film is thermoformable with the paint film so as to form a thermoformable masked paint film. After the masked paint film is thermoformed, the masking film is still readily removable from the paint film. It is desirable for the masking film to also be moldable with the paint film so as to form a moldable masked paint film. After the masked paint film is molded, the masking film is readily removable from the molded paint film. For a paint film with a clear coat, it is desirable for the urethane layer of the masking film to be bonded to the clear coat layer. The urethane layer is operatively adapted so as to at least substantially retain the high gloss and DOI of the paint film, especially a paint film having a clear coat layer, after the masked paint film is thermoformed and/or molded and the masking film is removed from the paint film.

It can be desirable for the paint film to include a support or reinforcing layer which is adhesively or otherwise bonded to the back side of the color coat layer to provide structural support to the paint film. It is desirable for this support layer to be bondable (e.g., by molding) to a substrate (e.g., a molded plastic shell) which forms a portion or all of an article or part.

It is believed desirable for the masking film to be operatively adapted to stretch (i.e., elongated) substantially the same degree with the paint film during the thermoforming and/or molding of the masked paint film. It is also believed desirable for the masking film of the elongated masked paint film to exhibit a memory (i.e., a degree of recovery from the amount of elongation) that is substantially the same as or similar to that of the paint film as the masked paint film cools down after being heated (e.g., thermoformed and/or molded). It may further be desirable for the masking film to be at least as strong as or stronger than the paint film portion of the masked paint film, at the thermoforming and/or molding temperature, while not exhibiting a substantial degree of recovery after cooling off from being heated.

It is desirable for the masking film to be sufficiently bonded to the paint film to remain adhered thereto, without substantial separation, during handling before and during the processing (e.g., thermoforming and/or molding) of the masked paint film, while still being readily removable from the paint film after being so processed.

The paint film can include a color coat layer containing metallic flakes. The present masking film is especially desirable for maintaining the high gloss and DOI of a paint film which includes such a color coat layer. Paint films having a color coat layer containing metallic flakes appear to be more susceptible to losing their gloss and DOI when thermoformed. The paint film and masking film can be formed together or separately. It can be desirable for the paint film and masking film to be formed separately, for the paint film to have a high gloss and DOI finish on one side, for the masking film to have a high gloss finish on one side, and for the paint film and masking film to be laminated together with each finished side facing and contacting the other.

In another aspect of the present invention, a method is provided for making a paint film assembly. The method comprises the steps of: providing a paint film having a high gloss and DOI; providing a masking film comprising a urethane layer; and bonding the masking film to the paint film to form a masked paint film that is thermoformable and/or moldable, where the masking film is readily removable from the paint film. The urethane layer is operatively adapted so that after the masked paint film is thermoformed and/or molded and the masking film is removed, the paint film retains its original high gloss and DOI, at least to a substantial degree. The present method may include the step of separately forming the paint film and the masking film before the bonding step.

It is desirable for the forming step to form a finished surface on the paint film and on the masking film and for the bonding step to include laminating together the finished surface of the paint film and the finished surface of the masking film to form the masked paint film. The separate forming step can include the step of forming the paint film, for example, by water or solvent casting the paint film onto a high gloss surface of a substrate (e.g., a liner) so as to form a finish surface on the paint film which exhibits a high gloss and DOI. The separate forming step can also include the step of forming the masking film, for example, by liquid (i.e., water or solvent) casting the urethane layer onto a high gloss surface of another substrate (e.g., a liner or the paint film) so as to form a finish surface on the urethane layer which exhibits a high gloss. When the substrate being used for casting the urethane layer is not the paint film, the paint film is removed from the one substrate and the urethane layer is removed from the other substrate before the bonding step. The bonding step includes laminating together the finish surface of the paint film and the finish surface of the urethane layer to form the masked paint film. When the paint film being provided includes a clear coat layer, the step of forming the paint film includes forming the clear coat onto the surface of the substrate so as to form a finish surface on the clear coat having a gloss which gives the paint film a high gloss and DOI.

The present method can include the steps of thermoforming the masked paint film into a desired shape and removing the masking film from the paint film. The present method can also include the steps of thermoforming the masked paint film into a desired shape, bonding the masked paint film to a substrate, and removing the masking film from the paint film. In addition, the present method can include the steps of thermoforming the masked paint film into a desired shape, insert molding the masked paint film to a molded plastic part, and removing the masking film from the paint film.

DETAILED DESCRIPTION OF THE INVENTION

Although the present invention is herein described in terms of specific embodiments, it will be readily apparent to those skilled in this art that various modifications, re-arrangements, and substitutions can be made without departing from the spirit of the invention. The scope of the present invention is thus only limited by the claims appended hereto.

Figure 1:
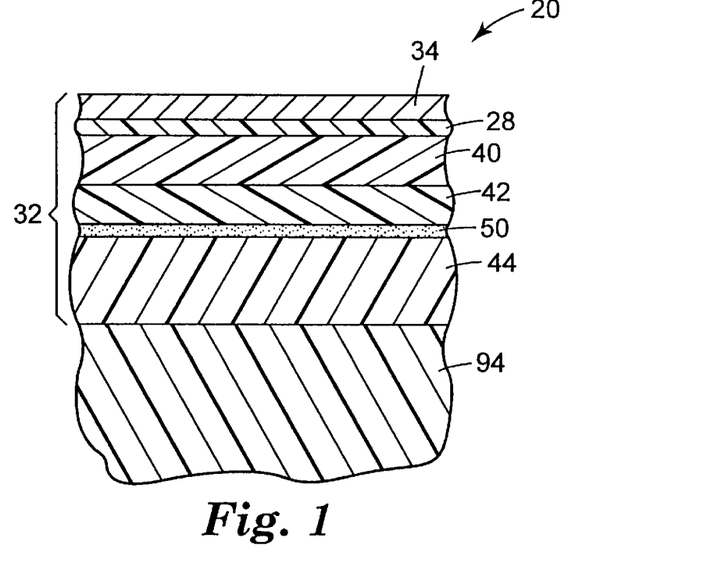
FIG. 1 is a cross-sectional view of a paint film assembly according to the principles of the present invention.

Referring to FIG. 1, a paint film assembly 20, according to the present invention, includes a thermoformable paint film 22 and a masking film 24. The paint film has a top surface 26 with a high-gloss and DOI (i.e., distinctness of image). It is desirable for the surface 26 to have at least about a 60 gloss at 20 degrees and at least about a 60 DOI. The masking film 24 includes a urethane layer 28 having a high-gloss surface 30. The high-gloss surface 30 of the urethane layer 28 is bonded to the high-gloss/DOI surface 26 of the paint film 22 and readily removable therefrom so as to form a thermoformable masked paint film 32. It is desirable for the surface 30 of the masking film 24 to have at least about a 60 gloss at 20 degrees.

Figure 2:
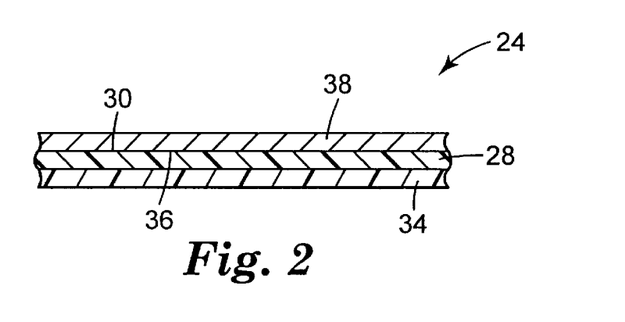
FIG. 2 is a cross-sectional view of a masking film, according to the present invention, mounted on a liner.

Referring to FIG. 2, it may be desirable for the masking film 24 to include a reinforcing layer 34 bonded to the back of the urethane layer 28 (i.e., to the side opposite of the surface 30) in order to make it easier when it comes time to remove the masking layer 24 from the paint film 22. Without the reinforcing layer 34, the urethane layer 28 may tend to tear apart and be pulled off of the thermoformed and/or molded paint film 22 in pieces. With the reinforcing layer 34, the masking film 24 is more likely to come off in one piece. Satisfactory results have been obtained using a urethane dispersion that is cast onto a high-gloss surface 36 of a release liner or carrier 38. Examples of satisfactory castable urethane mixtures, along with their compositions, are described in detail below. It is desirable for the surface 36 of the liner 38 to have the highest gloss possible in order to provide the surface 30 of the urethane layer 28 with such a high gloss. It has been found desirable for the urethane layer 28 to have a thickness within the range of from about 0.6 mils to about 1.6 mils. In order to reduce the likelihood of blisters, it has been found more desirable for the thickness of the urethane layer 28 not to exceed about 1.2 mils.

Satisfactory results have been obtained using a polyester material to make a liner 38 for the exemplary urethane layer 28 described below. An acceptable polyester liner 38 is formed with a surface having a high gloss finish, for example, by being cast onto a chrome roller, and with a biaxial orientation so as to have a high tensile strength. The liner 38 is also readily removable from the urethane layer 28 so that separation of the surfaces 30 and 36 will not cause a significant degradation in the level of gloss exhibited by the urethane surface 30.

It is desirable for the urethane layer 28 of masking film 24 to exhibit no cross-linking (i.e., to be a pure thermoplastic). Even so, some degree of cross-linking in the urethane layer 28 can be acceptable as long as the masking film 24 is still able to elongate with the paint film 22 during the thermoforming and/or molding of the masked paint film 32. One example of a cast urethane material for layer 28 that has no cross-linking includes a urethane resin in the form of a latex dispersion manufactured by ICI Resins US, of Wilmington, Mass., under the designation NeoRez R 9679. The urethane latex dispersion resin is mixed with a common solvent such as, for example, dibutyl acetate and/or Butyl Carbitol. This exemplary urethane material also includes a surfactant manufactured by Union Carbide Danbury, Conn., under the designation Triton GR-7M, to help obtain uniform wetting; two fluid silicones manufactured by BYK Chemie USA of Wallingford, Conn., under the designations BYK 301 and BYK 307, to reduce the adhesion between the masking film 24 and the paint film 22 (i.e., to facilitate the removability of the masking film 24); and an inspection additive manufactured by Clariant Corporation of Charlotte, N.C., under the designation Levcophor B-302, which turns white under black light to verify the presence of the masking film 24.

A first exemplary urethane layer 28 was formed by premixing 3000 grams of the urethane resin NeoRez R 9676 with 6.0 grams of the surfactant Triton GR-7M and 3.0 grams of the UV colorant Leucophor B302. Next, 9.0 grams of the liquid silicone BYK 301 and 3.0 grams of the liquid silicone BYK 307 were blended into 210 grams of the solvent dibutyl acetate. The urethane layer material was then formed by slowly adding the liquid silicone and solvent blend to the urethane resin premix using a high shear mixer. After all of the materials were added, the mixer was run for about 10 minutes. The composition was left covered for about 24 hours to de-aerate. A 0.06 mm thick high gloss smooth polyester film carrier was threaded through a knife coater and the urethane layer material was knife coated onto the high gloss surface of the polyester carrier to a wet coating thickness of 0.15 mm. This wet coating was then dried in an oven for 2 minutes at 66° C., 2 minute at 93° C., and 1 minute at 149° C. The resulting urethane layer 28 had a nominal thickness of 0.03 mm. The urethane layer 28 can be used alone as the masking film 24 or it may be reinforced by one or more other layers.

A second exemplary urethane layer 28 was formed according to the above procedure for the first exemplary layer 28 but with 2,790.0 grams of the NeoRez R 9679, 6.0 grams of the Triton GR-7M, 9.0 grams of the BYK 301, 3.0 grams of the BYK 307, 3.0 grams of the Leucophor B-302, and 189.0 grams of the solvent Butyl Carbitol. When mixing together the various components of either of these batches of urethane material, the dibutyl acetate and the butyl carbitol should each be fed in very slowly to prevent the mixture from being shocked into coalescing.

Another example of a urethane material suitable for being liquid cast into the layer 28 includes the above-described NeoRez R 9679 urethane resin and a suitable crosslinker such as, for example, the crosslinking agent manufactured by ICI Resins US under the designation NeoCryl CX-100. This exemplary urethane material also includes the above-described surfactant Triton GR-7M; and the common solvent butyl carbitol, manufactured, for example, by Union Carbide Corporation. If desired, the inspection additive Leucophor B-302 can be added to this cross-linkable batch of urethane material.

A third exemplary urethane layer 28, that exhibits some cross-linking, can be formed by premixing 90.79 weight percent of the urethane resin NeoRez R 9676 with 0.18 weight percent of the surfactant Triton GR-7M. Next, 9.03 weight percent of the solvent butyl carbitol was slowly added to the urethane resin premix using a high shear mixer. After all of the materials are added, the mixer is run for an additional period of time. Just before the urethane layer is to be formed, 1.20 weight percent of the cross-linking agent NeoCryl CX-100 is mixed in. This composition is left covered for a suitable time to de-aerate. A high gloss smooth polyester film carrier is threaded through a knife coater and the urethane layer material is knife coated onto the high gloss surface of the polyester carrier to a suitable wet coating thickness to produce the desired dry layer thickness. This wet coating is then dried in an oven.

It is believed that the urethane layer 28 may be formed by liquid (i.e., water-borne or solvent) casting or by extrusion (e.g., blown film extrusion). The extruded layer 28 would be bonded (e.g., laminated) to the paint film. It is believed that such a cast or extruded urethane layer 28 can be made from a single urethane resin, a urethane copolymer, or a polymer alloy of a urethane.

One example of a polymeric material suitable for forming the optional reinforcing layer 34 is a solvent cast polyvinylchloride (PVC) dispersion that includes the PVC resin powder manufactured by Geon Corporation of Avon, Ohio, under the designation Geon 178; the polymeric plasticizer manufactured by Velsicol Corporation of Chattanooga, Tenn., under the designation Admex 770; the heat stabilizer manufactured by Witco of Grennwich, Conn., under the designation Nuostab V-1923; and the common solvents mineral spirits, diisobutyl ketone and xylol.

An exemplary reinforcing layer 34 can be formed by preparing a solvent blend of a mixture of 4.04 grams of mineral spirits, 7.63 grams of diisobutyl ketone, and 10.78 grams of xylol. Then, 18.72 grams of the polymeric plasticizer Admex 770 and 2.67 grams of the heat stabilizer Nuostab V-9123 are added to the solvent. Next, 56.16 grams of the PVC resin Geon 178 is slowly added to the solvent blend using a high shear mixer to disperse the resin, and then mixed for an hour to form a uniform composition for the reinforcing layer 34. The reinforcing layer composition is then knife coated directly onto the urethane layer 28, which is on the polyester carrier 38, to a wet coating thickness of 0.076 mm. The wet masking film 24 is dried in an oven for 1 minute at 66° C., 1 minute at 93° C., 1 minute at 149° C., and 1 minute at 204° C. The resulting reinforcing layer 34 has a thickness of about 0.038 mm, and the resulting masking film has a thickness of 0.068 mm.

Figure 3:
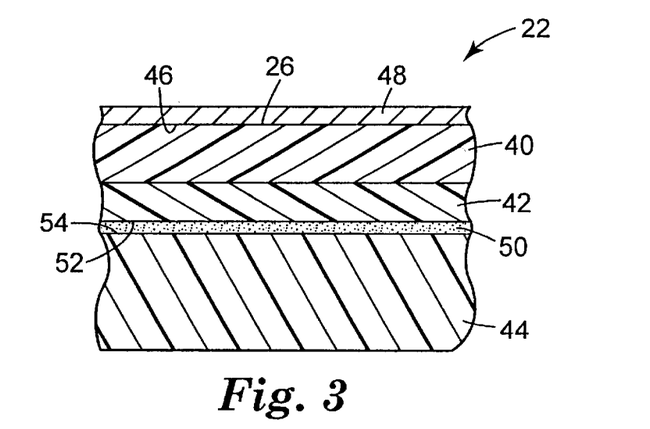
FIG. 3 is a cross-sectional view of a paint film, according to the present invention, mounted on a liner.

Referring to FIG. 3, one embodiment of the paint film 22 includes a clear coat layer 40 bonded to a color-coat layer 42. The clear-coat layer 40 and color-coat layer 42 can be formed and bonded together in any suitable way. For example, they can each be formed by being extruded or cast. They can be separately formed and laminated or otherwise bonded together; or they can be coated one onto the other (e.g., by being extruded, cast or sprayed one onto the other). It has been found desirable for the paint film 22 to include a reinforcing layer 44 bonded to the back of the color-coat layer 42. Satisfactory results have been obtained using a clear-coat layer 40 made from an alloy of a thermoplastic fluorinated polymer dispersed in an acrylic resin. For example, the clear-coat layer 40 can be a dispersion of polyvinylidene fluoride (PVDF) dispersed as a separate phase in a polymethylmethacrylate (PMMA) matrix or a polyethylmethacrylate (PEMA) matrix. The clear-coat layer 40 can be dispersion cast and dried onto a liner or carrier 48 so as to provide the high-gloss/DOI surface 26 of the paint film 22. Satisfactory results have been obtained using a liner 48 made of polyester, like the polyester liner 38 described above. Liner 48 must also be removable from the clear coat layer 40 so as not to significantly degrade the gloss and DOI of the paint film surface 26. It has also been found desirable to form the color-coat layer 42 by dispersion casting a dispersion of PVDF in PMMA onto the clear-coat layer 40. The color of layer 42 can be provided by any suitable means including by mixing metallic-colored particles or flakes into the PVDF/PMMA dispersion before casting onto the clear-coat layer 40.

While the present invention is not necessarily intended to be so limited, it has been found that a clear-coat layer 40 made from a dispersion casting of PVDF dispersed in PMMA can be more desirable than a similar clear-coat layer made from solution casting a solution of PVDF in PMMA. Such a dispersion-cast clear-coat layer 40 is typically less expensive to manufacture than a similar solution-cast layer 40. The use of the present masking film 24, as taught herein, has been found to enable a PVDF/PMMA dispersion cast clear-coat layer 40 to retain a high gloss, and the resulting paint film 22, a high gloss and DOI, during the thermoforming and/or molding of the masked paint film 32. It has been found that such a paint film 22, having a PVDF/PMMA dispersion-cast clear-coat layer 40, would suffer significant degradation in its gloss and DOI during thermoforming and/or molding if not for the present masking film 24. Examples of a paint film having a solution-cast PVDF/PMMA clear coat can be found in PCT Application No. PCT/US 88/00991 (International Publication No. WO 88/07416) having an international filing date of Mar. 25, 1988, and an international publication date of Oct. 6, 1988, which publication is incorporated herein by reference in its entirety.

Examples of other paint films can be found in U.S. patent application Ser. No. 08/716,681, filed Sep. 16, 1996, entitled PAINT FILM AND METHODS OF MANUFACTURE AND APPLICATION TO OBJECTS SUCH AS AUTOMOBILE PARTS, assigned to the same assignee as the present application, and which is herein incorporated by reference in its entirety. Examples of addition paint films can also be found in U.S. Pat. Nos. 4,810,540, issued Mar. 7, 1989; 4,931,324, issued Jun. 5, 1990; 4,943,680, issued Jul. 24, 1990; and 5,215,826, issued Jun. 1, 1993, all of which are incorporated herein by reference in their entirety. Unlike U.S. Pat. No. 5,215,826, the high-gloss surface of the present masking film is formed with a layer of urethane material. In addition, compared to that disclosed in the U.S. Pat. No. 5,215,826 patent, the present masked paint film 32 can be more deeply thermoformed for use with heavily contoured parts.

The reinforcing layer 44 can be included to provide additional strength to the paint film 22. Satisfactory results have been obtained using an extruded reinforcing layer 44 made from a thermoplastic olefin (TPO) or an acrylonitrile butadiene styrene (ABS). It has been found desirable to bond the reinforcing layer 44 to the back of the color-coat layer 42 by using an adhesive layer 50 made, for example, of a polyurethane (PUR) adhesive (e.g., a moisture cured PUR adhesive). The adhesive layer 50 can, for example, be reverse-roll coated or knife coated onto the color-coat layer 42. To increase the bonding strength of the adhesive layer 50, the surfaces 52 and 54 of the color-coat layer 42 and reinforcing layer 44, respectively, can be corona-treated.

An exemplary paint film 22 includes a clear-coat layer 40 made from liquid casting a dispersion of PVDF in PMMA or PEMA onto the high gloss surface of a PET carrier 48 and drying the wet applied layer 40 to a dry thickness of about 1.9 mils. A color-coat layer 42 is then cast onto the dried clear-coat layer 40. The color layer is made from casting a colored dispersion of PVDF in PMMA onto the back of the clear-coat layer 40 (i.e., the surface opposite to surface 26). The color-coat layer 42 is applied so that, when dried, it has a thickness of about 1.5 mils. A surface of an extruded reinforcing layer 44, made from TPO or ABS and having a thickness of about 17 mils, is corona treated and bonded to the corona treated back surface of the color-coat layer 42 with an adhesive layer 50 of PUR having a thickness of about 0.3 mils.

Figure 4:
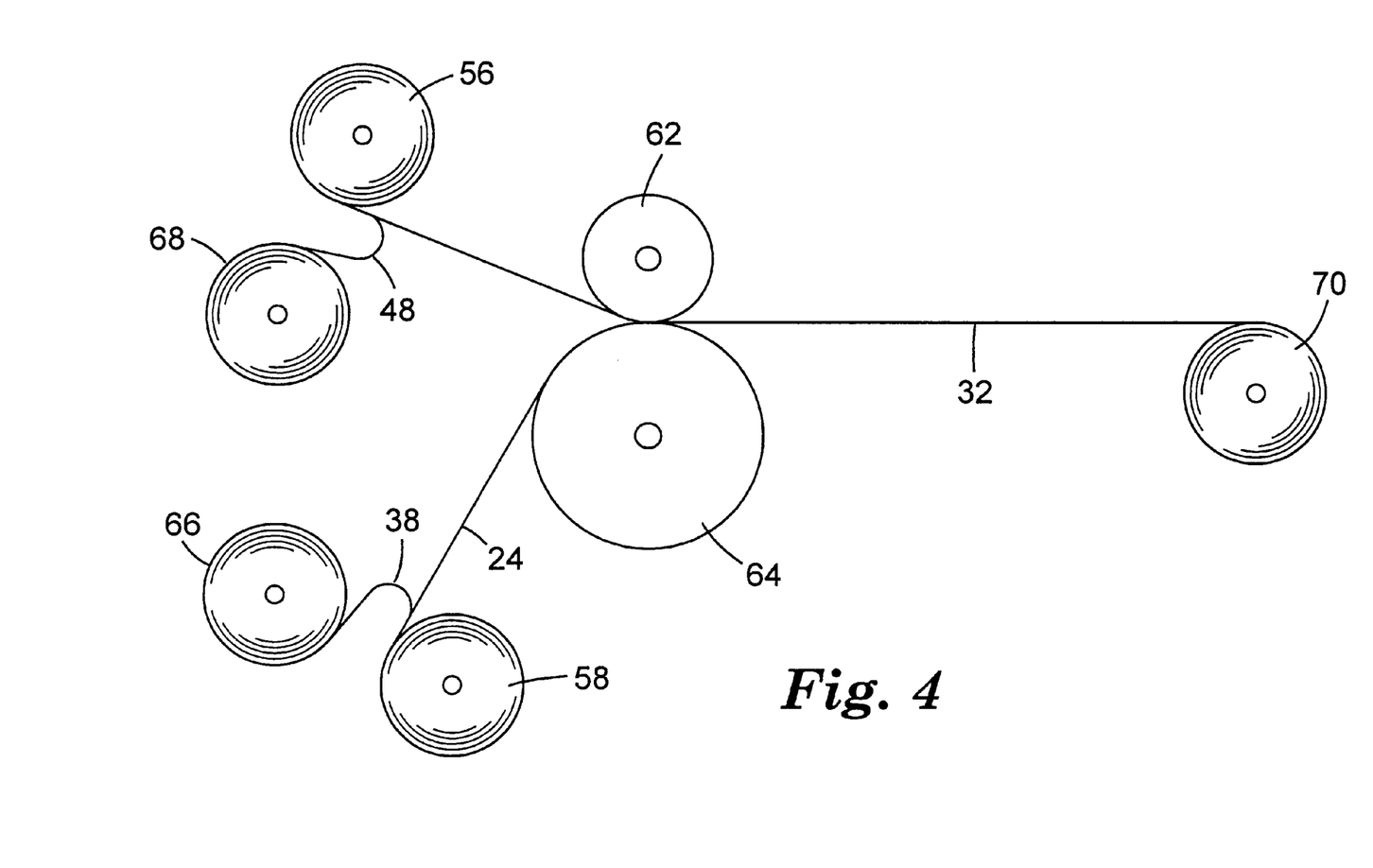
FIG. 4 is a schematic diagram of a process for laminating together a paint film and a masking film to form a masked paint film.
Figure 5A:
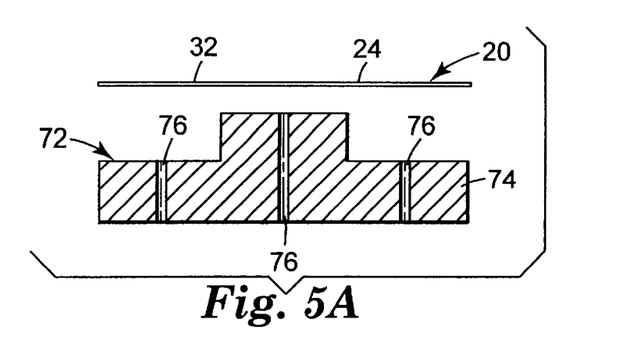
FIGS. 5A–F are cross-sectional views of a male thermoforming mold and a sheet of a masked paint film, according to the present invention, in various stages of a thermoforming process.
Figure 5B:
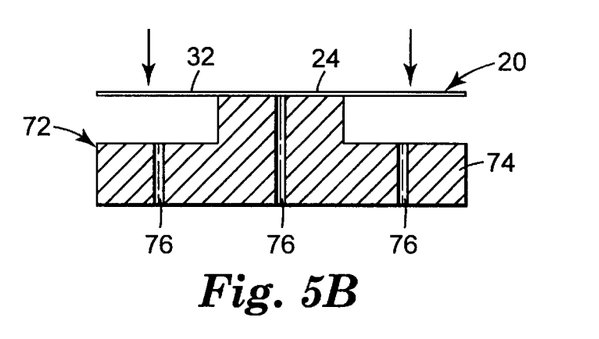
Figure 5C:
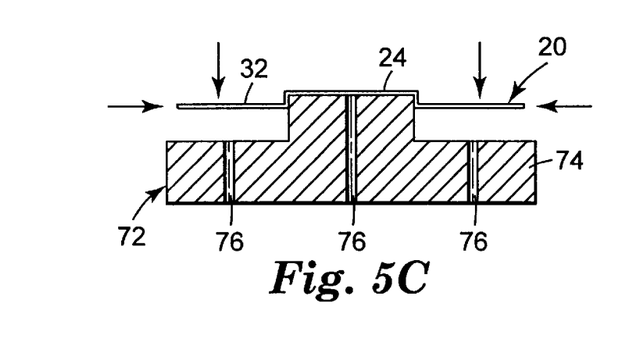
Figure 5D:
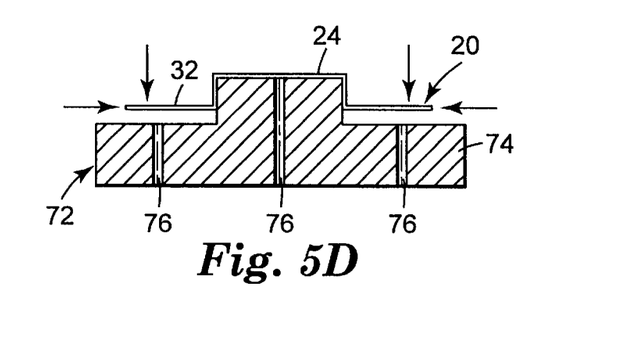
Figure 5E:
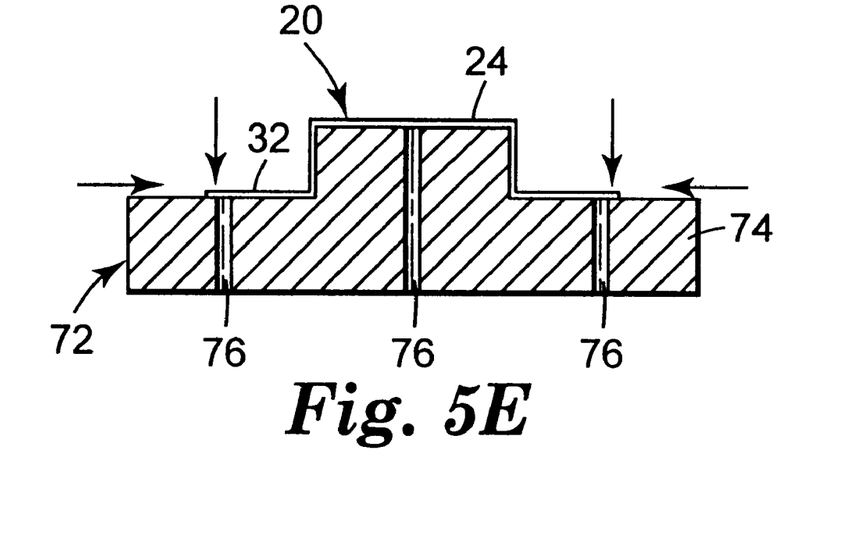
Figure 5F:
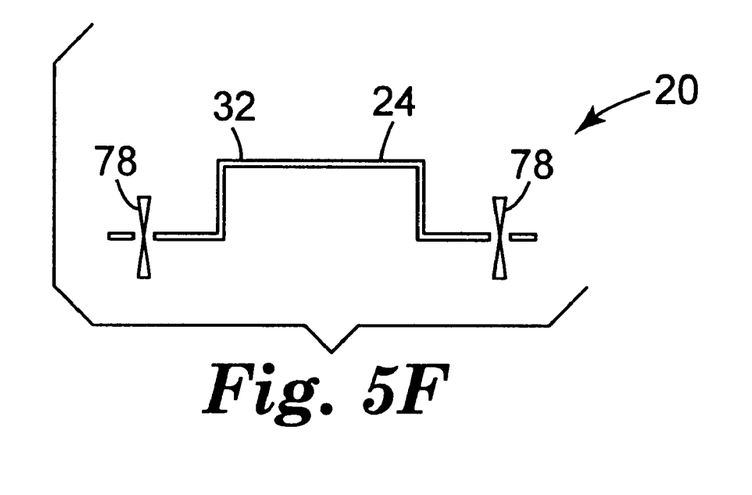

Referring to FIG. 4, the masked paint film 32 of the paint film assembly 20 can be formed by bonding the masking film 24 and the paint film 22 together. Initially, the liner 48 is removed from the paint film 22 and the liner 38 is removed from the masking film 24. The high-gloss surface 30 of the masking film 24 and the high-gloss/DOI surface 26 of the paint film 22 are then releasably bonded together. One way of obtaining such a releasable bond is by laminating the films 22 and 24 together. In an exemplary laminating process, the paint film 22 and the masking film 24 are pulled off of respective supply rollers 56 and 58 and through a hot nip site 60 formed between a rubber roller 62 and a steel roller 64. The steel roller 64 is heated by conventional means. The liners 48 and 38 are removed before the paint film 22 and masking film 24 are laminated together. It is desirable for the liner 38 to remain on the masking film 24 while the film 24 is on the supply roller 58. The liner 38 is then peeled off of the masking film 24 and wound up on a roll-up roller 66 before the masking film 24 reaches the nip site 60. The liner 48 can be removed before the paint film 22 is wound onto the supply roller 56. Alternatively, the paint film 22 may be wound onto roller 56 with the liner 48. The liner 48 would then be peeled off and wound on a roll-up roller 68 (shown in phantom in FIG. 4) before the paint film 22 and masking film 24 are laminated together.

Satisfactory results have been obtained with the rubber roller 62 having a Durometer reading on its surface of about a 70 Shore A, the hot roller 64 producing a temperature at the nip site 60 in the range of from about 160° F. to about 230° F., and for the rollers 62 and 64 to apply a pressure of about 100 psi to 110 psi, and for the films 22 and 24 traveling at a speed in the range of about 3 ft./min. to about 20 ft./min.

After the paint film 22 and masking film 24 are laminated together, the resulting masked paint film 32 is wound up on another roll-up roller 70 for subsequent processing, such as a thermoforming and/or molding operation. Alternatively, the masked paint film 32 may be subsequently processed (e.g., thermoformed) in-line, rather than being wound onto the roller 70, being unwound and then further processed.

Referring to FIGS. 5A–F, the masked paint film 32 can be pre-formed (e.g., by a thermoforming process) into the shape or configuration desired for the final article or part to be formed (e.g., an automobile side molding, side mirror housing, bumper, fender, etc.). The present masked paint film 32 can be thermoformed using conventional techniques well known in the industry. In general, such a thermoforming process includes the step of unrolling the masked paint film 32 from a roller 70 and feeding the film 32 through a conventional thermoforming apparatus 72. The thermoforming apparatus 72 includes a male vacuum forming mold 74 and a suitable means for heating (e.g., IR heaters which heat the film 32 from above) to thereby soften the masked paint film 32. The heated film 32 is positioned over the male mold 74. A plurality of vacuum holes 76 formed through the mold 74 are used to form a vacuum between and draw the heated film 32 down over the mold 74, until the softened film 32 conforms to the outer profile or contours of the male mold 74. Once the masked paint film 32 is fully thermoformed into the desired shape (see FIG. 5E), the now pre-formed film 32 is removed from the mold 74 and cooled, or allowed to air cool. At this point, the masking film 24 is either removed from the now pre-formed masked paint film 32 or left in place for subsequent processing (e.g., molding) with the paint film 22.

If necessary, the pre-formed masked paint film 32 is then trimmed of any excess film 32 by conventional means such as, for example, a standard cutting die 78 (herein represented by opposed cutting edges). Such a cutting die 78 can be made part of the thermoforming apparatus 72 so as to perform the trimming operation automatically after the thermoforming step. Alternatively, the trimming operation can be performed off-line, manually or automatically using a cutting die 78. Rather than the trimming operation being performed completely by such a cutting die 78, it can be desirable for the cutting die 78 to only partially trim the pre-formed masked paint film 32, with the remainder being trimmed manually. This latter two-step trimming operation can be desirable when the masking film 24 is to be removed before the pre-formed paint film 22 is subsequently processed (e.g., insert molded). It has been found that removal of the masking film 24 can be facilitated by cutting a portion of the film 32, to be trimmed, with scissors. Cutting with the scissors tends to cause the masking film 24 to separate enough from the paint film 22 to be more easily grasped. Once grasped, it is easier to peel the masking film 24 off of the paint film 22.

Referring to FIGS. 8A–F, rather than using a male vacuum forming mold 74, the thermoforming apparatus 72 can include a female vacuum forming mold 80 which includes vacuum holes 76 positioned to draw a heated masked paint film 32 down into a mold cavity 82. It is believed that by thermoforming the masked paint film 32 using a female vacuum forming mold 80, the film 32 can be formed more cost effectively. Typically, multiple molds 74 and/or 80 are used to thermoform a given section or sheet of the masked paint film 32. In this way, the masked paint film 32 can be simultaneously thermoformed at multiple locations thereon, with each of the thermoformed portions being suitable for covering an article or part. It is believed that using female molds 80, rather than the male molds 74, enables a greater number of thermoformed sections 83 (see FIGS. 8E and 8F) to be formed per unit area of masked paint film 32. By utilizing more of the masked paint film 32, there will be less scrap trimmed off.

Whichever type of mold 74 or 80 is used to thermoform the masked paint film 32, the film 32 is oriented relative to the mold 74 or 80 so that upon removal of the masking film 24, the high-gloss/DOI surface 26 of the paint film 22 forms the outer or exposed surface of the article or part being made. Typically, when the masked paint film 32 is to be thermoformed with the male mold of FIGS. 5A–F and when the film 32 is to be used for covering a generally convex portion of an article or part, the masking film 24 is on the side of the masked paint film 32 which does not contact the vacuum-forming mold 74. When the masked paint film 32 is to be thermoformed using a female-type forming mold 80 and when the film 32 is to be used for covering a generally convex portion of an article or part, the masked paint film 32 is oriented so that the masking film 24 is on the side that contacts the mold 80. When the masked paint film 32 is being thermoformed for a concave portion of an article or part, then the masking film 24 is oriented opposite to that described above for each mold type 74 and 80. When the subsequent processing involves insert molding, the pre-formed masked paint film 32, with or without the masking film 24 (i.e., with the film 24 left in place or removed), is usually trimmed to its final shape, for example, manually and/or with the cutting die 78 (see FIGS. 5F and 8F) so as to fit within the mold 84 (see FIGS. 6A–E).

Unless otherwise indicated, any reference to the masked paint film 32, in the following discussion regarding FIGS. 6A–E, is applicable to the film 32 with or without the masking film 24. A typical insert molding device 84 includes two die-halves 86 and 88 which define a mold cavity 90 therebetween. With the die-halves 86 and 88 separated, the pre-formed paint film 32 is positioned between the die halves 86 and 88. It is desirable for the pre-formed film 32 to be positioned against one of the die-halves 86 (as shown) or 88. The mold 84 is then closed, and the portion of the cavity 90 behind the pre-formed paint film 32 is filled with the desired plastic material via the injection port 92. The injected plastic material bonds to the film 32. Upon solidification, the plastic material forms a substrate 94 for the paint film 22. The resulting paint film assembly 20 can form a portion or all of the article or part being made. Upon cooling of the substrate 94 and paint film 32, the mold 84 is opened and the paint film assembly 20 is removed.

Figure 6A:
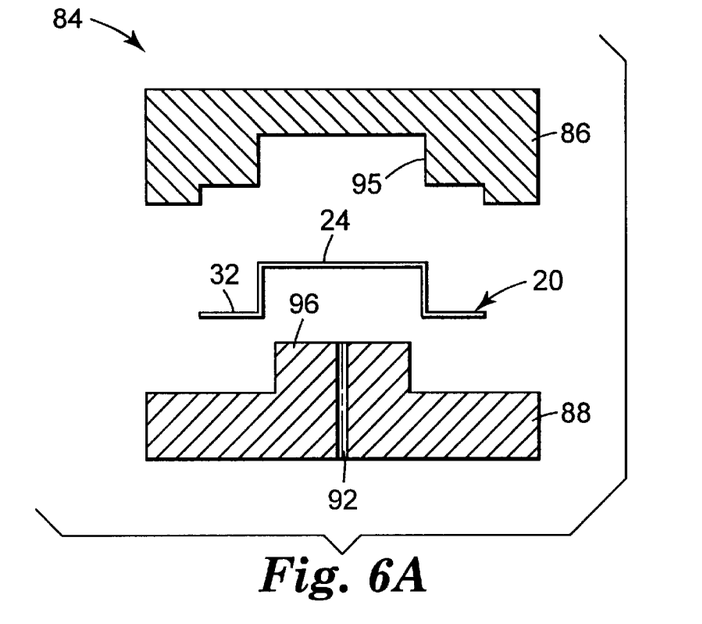
FIGS. 6A–E are cross-sectional views of an insert mold and a pre-formed sheet of a masked paint film or a paint film, according to the present invention, in various stages of an insert molding process.
Figure 6B:
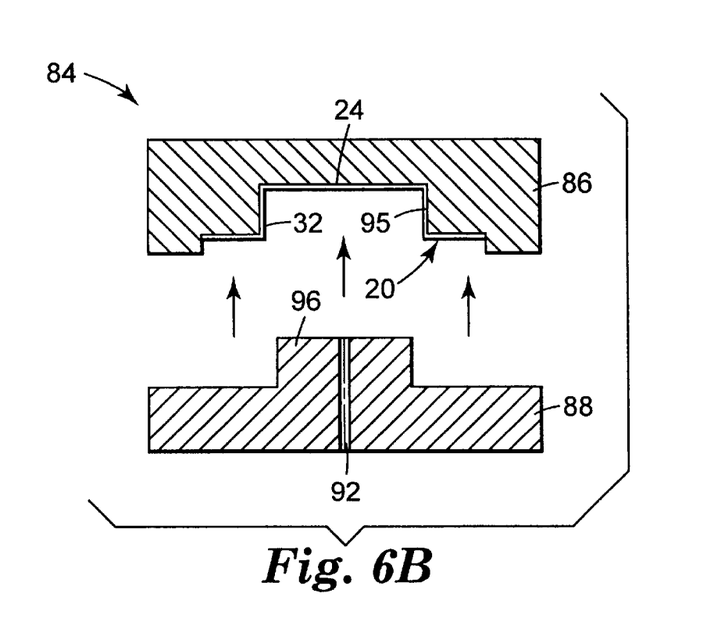
Figure 6C:
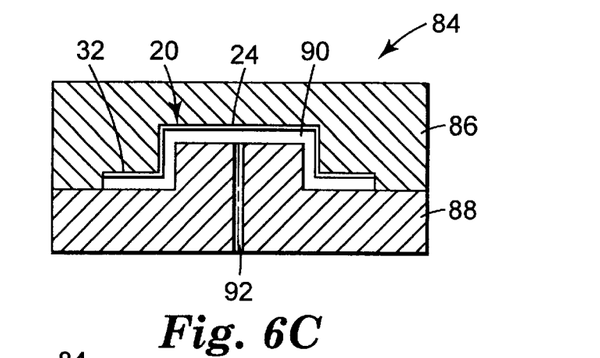
Figure 6D:
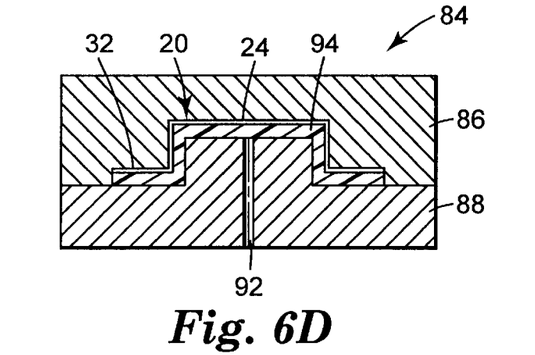
Figure 6E:
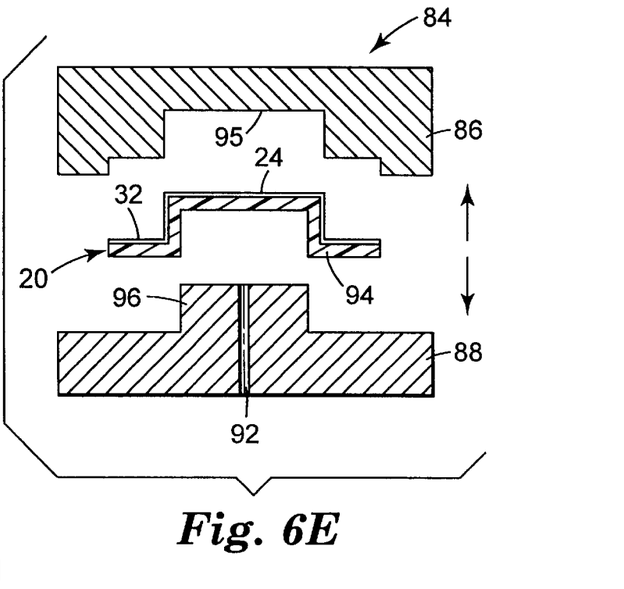
Figure 6F:
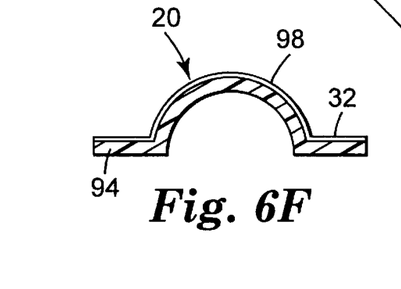
FIG. 6F is a cross-sectional view of a thermoformed and insert molded paint film assembly, according to the present invention, having a hemispherical shaped portion.
Figure 7A:
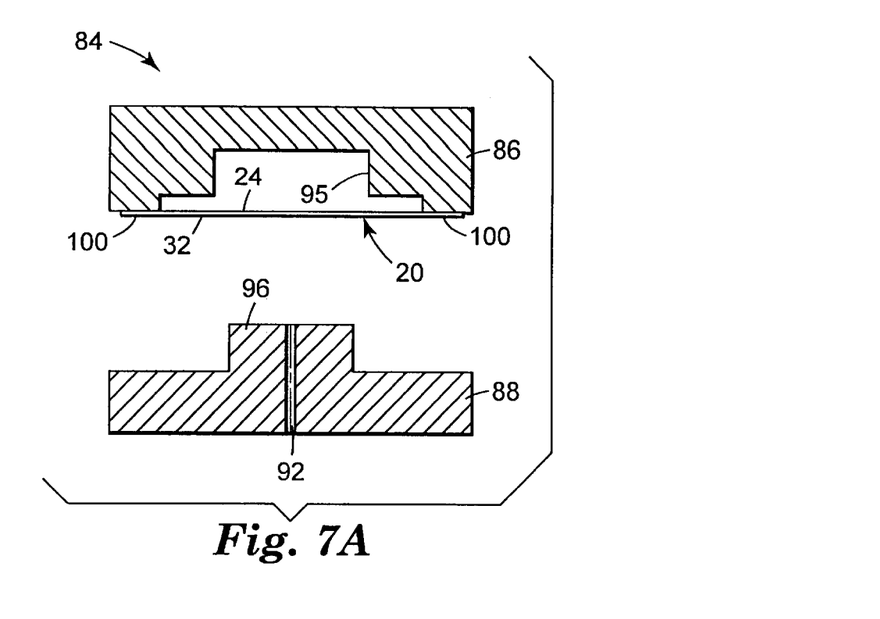
FIGS. 7A–G are cross-sectional views of an insert mold and a sheet of a masked paint film, according to the present invention, in various stages of an insert molding process where the masked paint film is being formed while being insert molded.
Figure 7B:
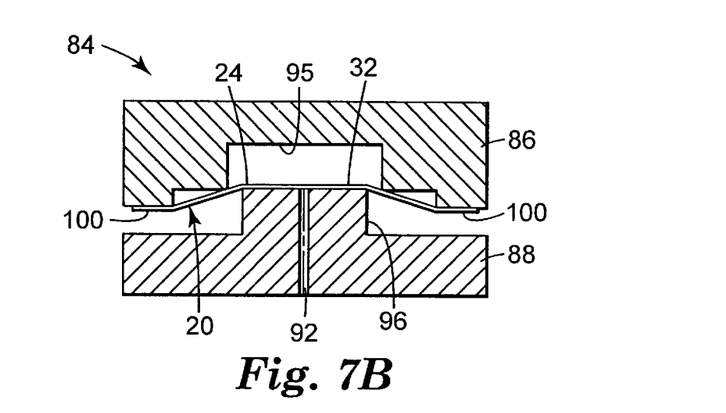
Figure 7C:
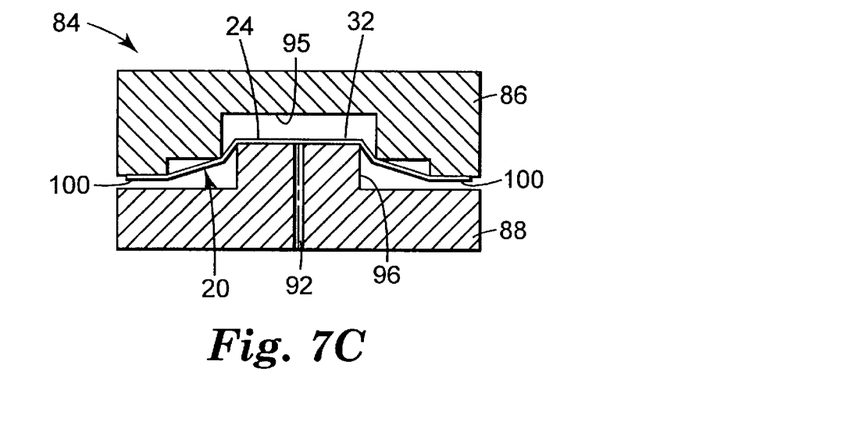
Figure 7D:
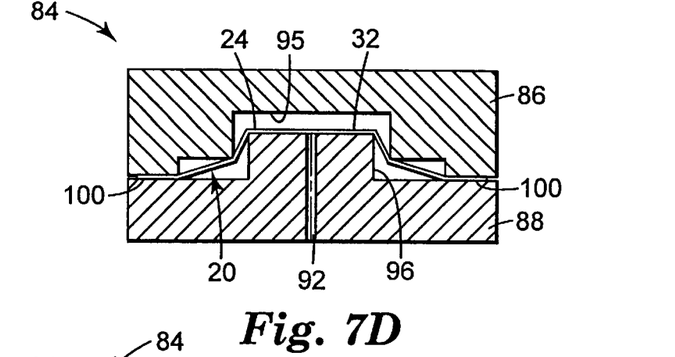
Figure 7E:
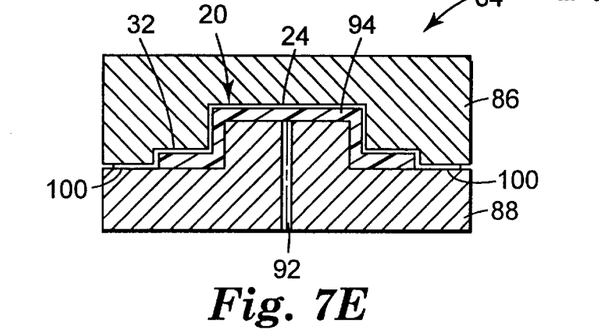
Figures 7F, 7G:
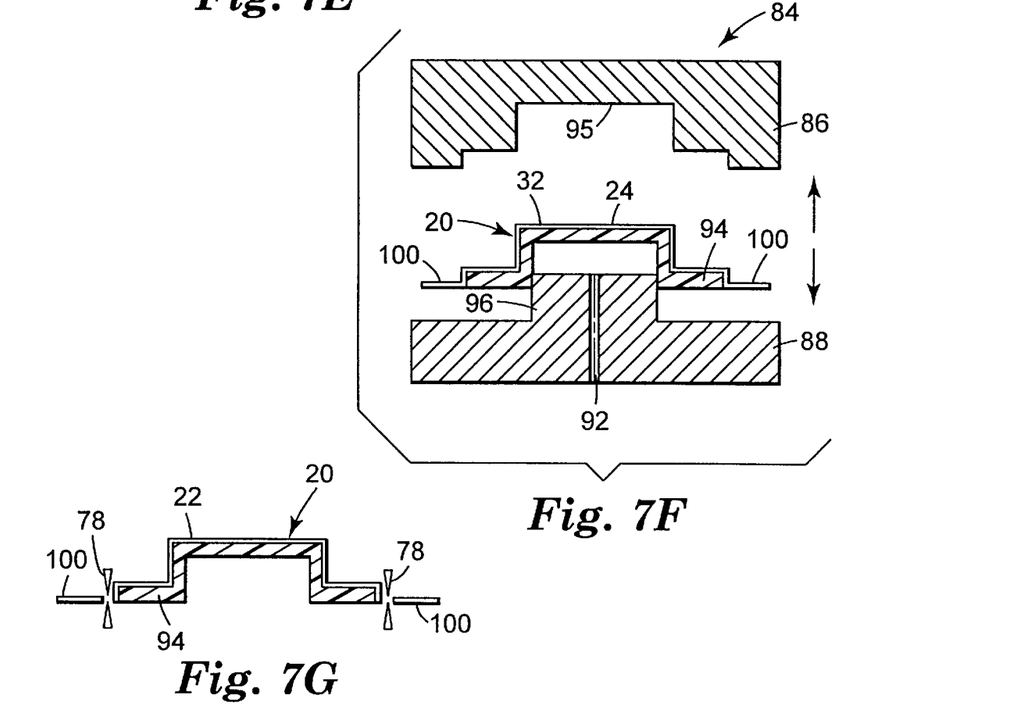
Figure 8A:
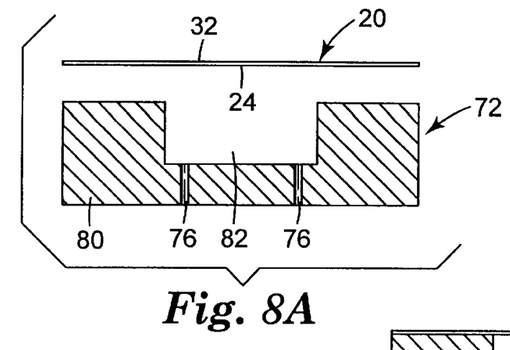
FIGS. 8A–F are cross-sectional views of a female thermoforming mold and a sheet of a masked paint film, according to the present invention, in various stages of a thermoforming process.
Figure 8B:
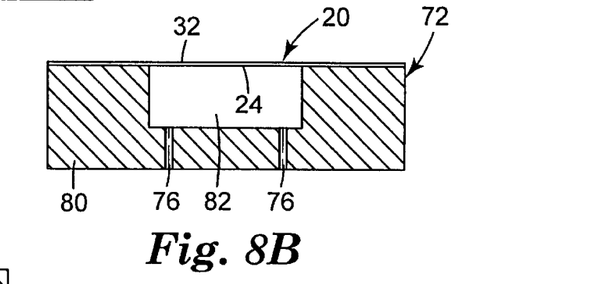
Figure 8C:
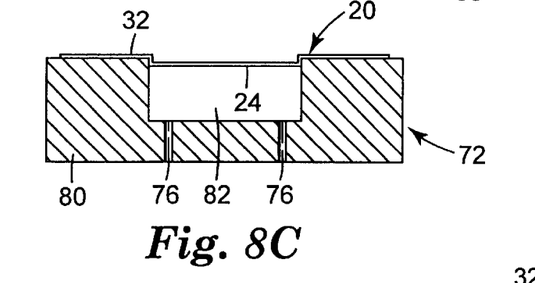
Figure 8D:
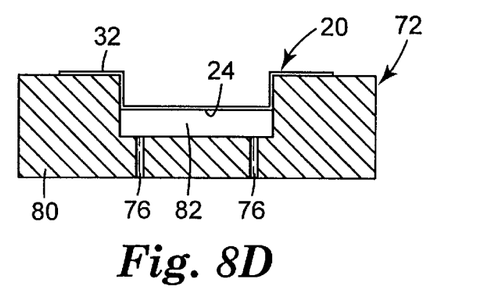
Figure 8E:
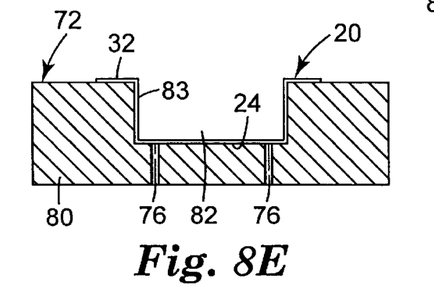
Figure 8F:
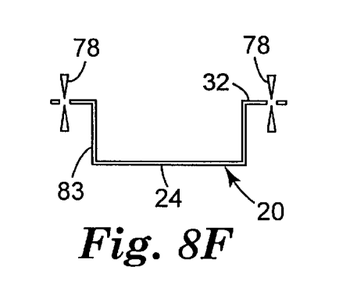

Unless the masked paint film 32 is pre-formed with substantially the same geometric detail as that found in the mold 84 (e.g., as the die-half 86), the pre-formed film 32 will not fit properly into the mold 84. Compared to such films taught by the prior art, the present masked paint film 32 is particularly suitable for being thermoformed to a high level of detail. In particular, depending on which side of the film 32 is injected with plastic, it is believed that the present masked paint film 32 can be thermoformed so as to match the contours of a mold cavity 95 or core 96, like that shown in FIGS. 6A–E, where the mold cavity 95 and core 96 have a rectangular or cubic structure. The present masked paint film 32 has been successfully thermoformed so as to have a portion 98 with a semi-circular or hemispherical shape (see FIG. 6F), to match the contours of a mold cavity or core having such a shape.

Referring to FIGS. 7A–G, instead of pre-forming the masked paint film 32 (see FIGS. 5A–F and 8A–F) and then insert molding the pre-formed paint film 32 (see FIGS. 6A–F), as described above, it may be desirable for the masked paint film 32 to be formed and molded at the same time. That is, the masked paint film 32 can be fully in-mold processed. In the illustrated example of such an inmold process, a previously separated section of the masked paint film 32 is positioned within the mold 84 between the die halves 86 and 84. It can be desirable for the section of masked paint film 32 to have an outer peripheral portion 100 (e.g., a peripheral rim) which is fixed in place relative to the die halves 86 and 88. For example, the outer peripheral rim 100 can be clamped or otherwise fixed to the female die half 86. With the section of the masked paint film 32 positioned between the die halves 86 and 88, the mold 84 is closed. As the mold 84 closes, the core 96 contacts the masked paint film 32, pushing the film 32 into the cavity portion 95 of the die-half 86. As the core portion 96 moves into the cavity portion 95 the masked paint film 32 is initially stretched (i.e., elongated). After the mold 84 is closed (see FIG. 7D), the mold cavity 90 is filled with molten polymeric material through injection opening 92. As the mold cavity 90 is being filled with the polymeric material, the now partially formed masked paint film 32 is forced into its final configuration, matching the contours of the cavity portion 95 (see FIG. 7E). If desired, the injection openings 92 can be formed in the die half 86 and the cavity 90 can be filled so as to force the partially formed paint film 32 to match the contours of the core portion 96. Once the polymeric material solidifies to form the substrate 94, the mold 84 is opened and the resulting paint film assembly 20 is removed. The resulting paint film assembly 20 can include a peripheral portion(s) 100 which is not backed by the substrate 94. If desired, this peripheral portion(s) 100 can be trimmed or otherwise removed by any suitable means such as, for example, manually and/or the cutting die 78.

An example of such an in-mold process and apparatus are disclosed in U.S. patent application Ser. No. 08/612,209, filed Mar. 7, 1996, entitled PAINT FILM AND METHODS OF MANUFACTURE AND APPLICATION TO OBJECTS SUCH AS AUTOMOBILE PARTS, which application is assigned to the assignee of the present application and is herein incorporated by reference in its entirety.

In order to help prevent air from becoming trapped between the masking film 24 and the applicable die-half (e.g., die-half 86 as shown in FIGS. 6A–E and 7A–G) during the molding operation, it may be desirable for the surfaces 30 and 34 of the urethane layer 28 and the liner 38, respectively, to be textured. The textured side of the urethane layer 28 would then provide paths for air to exit from between the layer 28 and the applicable mold die-half. This would require the other side of the urethane layer 28 (i.e., the side exposed to the air during the casting of the layer 28) to be laminated to the surface 26 of the paint film 22. Typically, the side of the urethane layer 28 that is exposed to the air when it is cast exhibits a high gloss.

From the above disclosure of the general principles of the present invention and the preceding detailed description, those skilled in this art will readily comprehend the various modifications to which the present invention is susceptible. Therefore, the scope of the invention should be limited only by the following claims and equivalents thereof.

What is claimed is:

1. A method of making a paint film assembly, said method comprising the steps of:

providing a paint film having a high gloss and DOI;

providing a masking film comprising a urethane layer, and bonding the masking film to the paint film to form a masked paint film that is thermoformable and so that the masking film is readily removable from the paint film, wherein the urethane layer is operatively adapted so that after the masked paint film is thermoformed and the masking film is removed, the paint film retains its original high gloss and DOI, at least to a substantial degree.

2. The method as set forth in claim 1, further comprising the step of:

separately forming the paint film and the masking film before said bonding step.

3. The method as set forth in claim 2, wherein said forming step forms a finished surface on the paint film and on the masking film, and said bonding step includes laminating together the finished surface of the paint film and the finished surface of the masking film to form the masked paint film.

4. The method as set forth in claim 2, wherein said separate forming step includes the steps of:

forming the paint film onto a surface of one substrate having a high gloss and DOI so as to form a finish surface on the paint film having a high gloss and DOI;

forming the urethane layer onto a surface of another substrate having a high gloss and DOI so as to form a finish surface on the urethane layer having a high gloss and DOI;

removing the paint film from the one substrate and the urethane layer from the other substrate before said bonding step, wherein said bonding step includes laminating together the finish surface of the paint film and the finish surface of the urethane layer to form the masked paint film.

5. The method as set forth in claim 4, wherein the paint film being provided includes a clear coat layer and said step of forming the paint film includes forming the clear coat onto the surface of the one substrate so as to form a finish surface on the clear coat having a high gloss and DOI.

6. The method as set forth in claim 2, wherein the masking film being provided comprises a cast urethane layer.

7. The method as set forth in claim 2, wherein said method includes the steps of:

thermoforming the masked paint film into a desired shape; and removing the masking film from the paint film.

8. The method as set forth in claim 2, wherein said method includes the steps of:

thermoforming the masked paint film into a desired shape;

bonding the masked paint film to a substrate; and removing the masking film from the paint film.

9. The method as set forth in claim 2, wherein said method includes the steps of:

thermoforming the masked paint film into a desired shape;

insert molding the masked paint film to a molded plastic part; and removing the masking film from the paint film.

10. The method as set forth in claim 2, wherein the paint film being provided includes a color coat layer containing metallic flakes.

11. The method as set forth in claim 1, wherein the paint film being provided includes a color coat layer laminated to a clear coat layer, and said step of bonding the masking film to the paint film includes bonding together the clear coat layer and the masking film so that the masking film is readily removable from the clear coat layer.

* * * * *

UNITED STATES PATENT AND TRADEMARK OFFICE
CERTIFICATE OF CORRECTION

PATENT NO. : 6,083,335
DATED : July 4, 2000
INVENTOR(S) : Charles T. Scullin et al.

Page 1 of 1

It is certified that error appears in the above-identified patent and that said Letters Patent is hereby corrected as shown below:

<u>Title page,</u>
Under "Foreign Patent Documents", "WO 91/03337" should read -- WO 94/03337 --.

Signed and Sealed this

Twenty-eighth Day of August, 2001

*Attest:*

NICHOLAS P. GODICI
*Attesting Officer*    *Acting Director of the United States Patent and Trademark Office*